Apr. 17, 1923.
J. S. EDWARDS
1,452,073
AUTOMOBILE RIM
Filed April 14, 1921
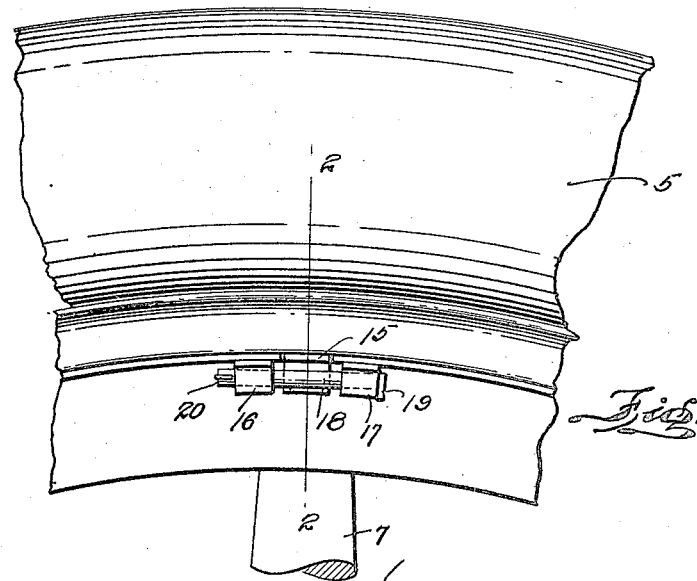
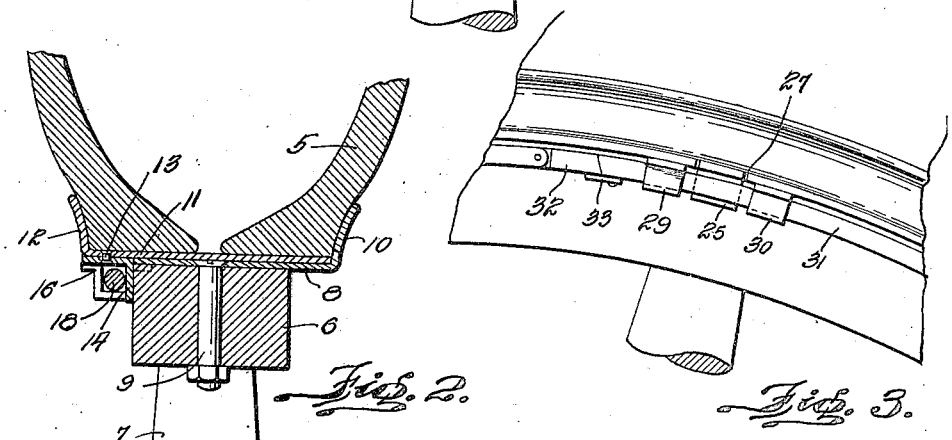
Inventor
J. S. Edwards.
By
O. E. Howd
Attorney Patented Apr. 17, 1923.

1,452,073

UNITED STATES PATENT OFFICE.

JOSE S. EDWARDS, OF HELPER, UTAH.

AUTOMOBILE RIM.

Application filed April 14, 1921. Serial No. 461,319.

*To all whom it may concern:*

Be it known that JOSE S. EDWARDS, citizen of the United States, residing at Helper, in the county of Carbon and State of Utah, has invented certain new and useful Improvements in Automobile Rims, of which the following is a specification.

This invention relates to automobile rims and more particularly to a sectional rim whereby an automobile tire may be easily and conveniently removed from the felly of a wheel or mounted thereon in a simple yet expedient manner without resorting to the use of special tools or implements.

The primary object of the invention resides in the provision of a sectional, telescopic automobile rim adapted to fit a tire casing and retain the same in proper position on the felly of a wheel, including a novel and improved locking device whereby the sections are prevented from circumferential as well as lateral movement with respect to each other.

Another object of the invention consists in the construction of an automobile rim having telescopic, complementary sections cooperating to grip and engage the sides of a pneumatic or solid tire and rigidly retain the same on the felly of a wheel said rim being provided with an attached locking device carried by one of said sections whereby the respective parts will be securely held in position and prevent separation of the sections due to circumferential or lateral thrust incident to the rim.

A still further and very important object of the invention will be found in its simplicity of construction, consisting of comparatively few parts therefor inexpensive to manufacture, thoroughly reliable and efficient in operation and use, practical, easily assembled without special tools or implements, strong and durable, and of universal application for use in connection with various size pneumatic or solid tire constructions for touring or commercial automobile wheels.

With these objects in view and others which will be manifest and suggested as the purpose and nature of my invention are revealed in the following specification and drawing wherein I have shown a practical, preferred embodiment thereof, Referring now to drawings wherein like parts designate corresponding parts throughout the specification, in the form of the invention illustrated by Figs. 1 and 2 of the drawing, numeral 5 designates a tire casing and 6 the felly of a wheel on which it is to be mounted, a portion of a wheel spoke being designated by numeral 7.

The rim proper consists of a pair of telescoping, interlocked sections, the inner section 8 being somewhat wider than the felly and adapted to be rigidly secured thereto by any suitable form of fastening element such as bolts and nuts 9, preferably positioned equi-distant about the said felly. The inner section 8 has an upturned, curved, flanged portion 10 which conforms to the contour of the casing, thus gripping and retaining the same in proper position with the complementary, outer section of the rim, now to be referred to.

The outer section 11 of said rim is substantially similar to the inner section 8, being also provided with an upturned, curved, flanged portion 12 for gripping the opposite side of the casing. The outer section 11 bears on inner section 8. The respective inner and outer sections of the rim above referred to, of course telescope with respect to each other in retaining a tire casing in its proper position on the felly of a wheel, the outer section being removable, and held in locked position to the inner section by the novel and improved locking device, now to be described in detail.

Riveted or otherwise secured as at 13 to the outer section 11 of the rim and near the outer edge thereof, I have provided angle iron members 14 which fits in a slot 15, cut out of the side of the inner section 8, preferably at equal distances about the circumference of the said section. The said inner section is also provided with attached, substantially Z-shaped keepers 16, 17 adapted to cooperate with the slots of the said section and designed to receive locking bolts or keys 18 therein, said key having an enlarged head 19 and retained by a cotter pin 20 whereby the respective sections of the rim will be held in their locked position. It will be readily apparent that since the angle iron member above referred to is retained in the slot or cut out portion behind the locking bolt held by the keepers that the inner and outer sections are prevented from circumferential or lateral movement with respect to each other and the tire will of course be always held in its proper position on the felly.

Referring now to the form of the invention shown in Figs. 3 and 4 of the drawing, I have shown the inner section 21 and the outer section 22 as formed with upturned flanges 23, 24 respectively and adapted to telescope in the same manner as above described to retain a tire casing. The angle iron member 25 which is also riveted as at 26 to the outer section is adapted to be also held in a slot 27 formed in the side of the inner section so that in their assembled position, the angle iron member will lie substantially flush with the side of the felly 28 as suggested by Fig. 4 of the drawing. The keepers 29, 30 of the inner section are arranged in the same relation as the Z-shaped keepers above referred to, being adapted to confine a metallic, spring hoop 31 which is provided with a hinged block 32 and a latching member 33 whereby the ends of said hoop are maintained in their proper locking position between the angle iron member and the keepers.

From this construction it will be quite apparent and readily understood that by providing a plurality of preferably equally spaced locking devices about the periphery of the rim and outside of the felly that the telescoping inner and outer sections of the rim may be held in proper position to rigidly retain a tire casing which is prevented from both lateral and circumferential movement as above set forth. In mounting a tire for instance on a wheel, the outer section only is manipulated and similarly in removing the tire, when the locking devices are removed, the outer section may be readily separated without considerable labor and without special tools or automobile appliances.

From the above description taken in connection with the accompanying drawings, it will be seen that I have provided a novel and improved, sectional, telescopic rim, capable of use both with pneumatic or solid tires and which may be readily mounted on the felly of a wheel without special skill or labor. In the accompanying drawings, I have shown my invention as embodied in one form by way of example and which in practice has been found to be highly satisfactory and efficient in obtaining the desired results. It will be understood however, that other embodiments may be adopted and resorted to without departing from the spirit and scope of the invention and that I do not wish to be limited or restricted to the exact form of the invention shown, except as specified and included in the subject matter hereinafter being claimed.

Having shown and described my invention what I now claim as new and desire to secure by Letters Patent of the United States is:—

An automobile tire rim, comprising two telescoping sections, one bearing on the other, means for fastening the inner of said sections to the felly of the wheel, means for securing the other section to the wheel comprising keepers, permanently attached at spaced relations to the outer section, angle irons permanently attached to the inner section at spaced relations and a locking bolt passing through said keepers for locking the two sections together to prevent circumferential and lateral movement thereof with respect to each other.

In testimony whereof I affix my signature in presence of two witnesses.

JOSE S. EDWARDS.

Witnesses:
 ROBERT HOWARD,
 O. F. BURTON.